June 15, 1965 W. F. RACE 3,188,747
TRUCK ALIGNER

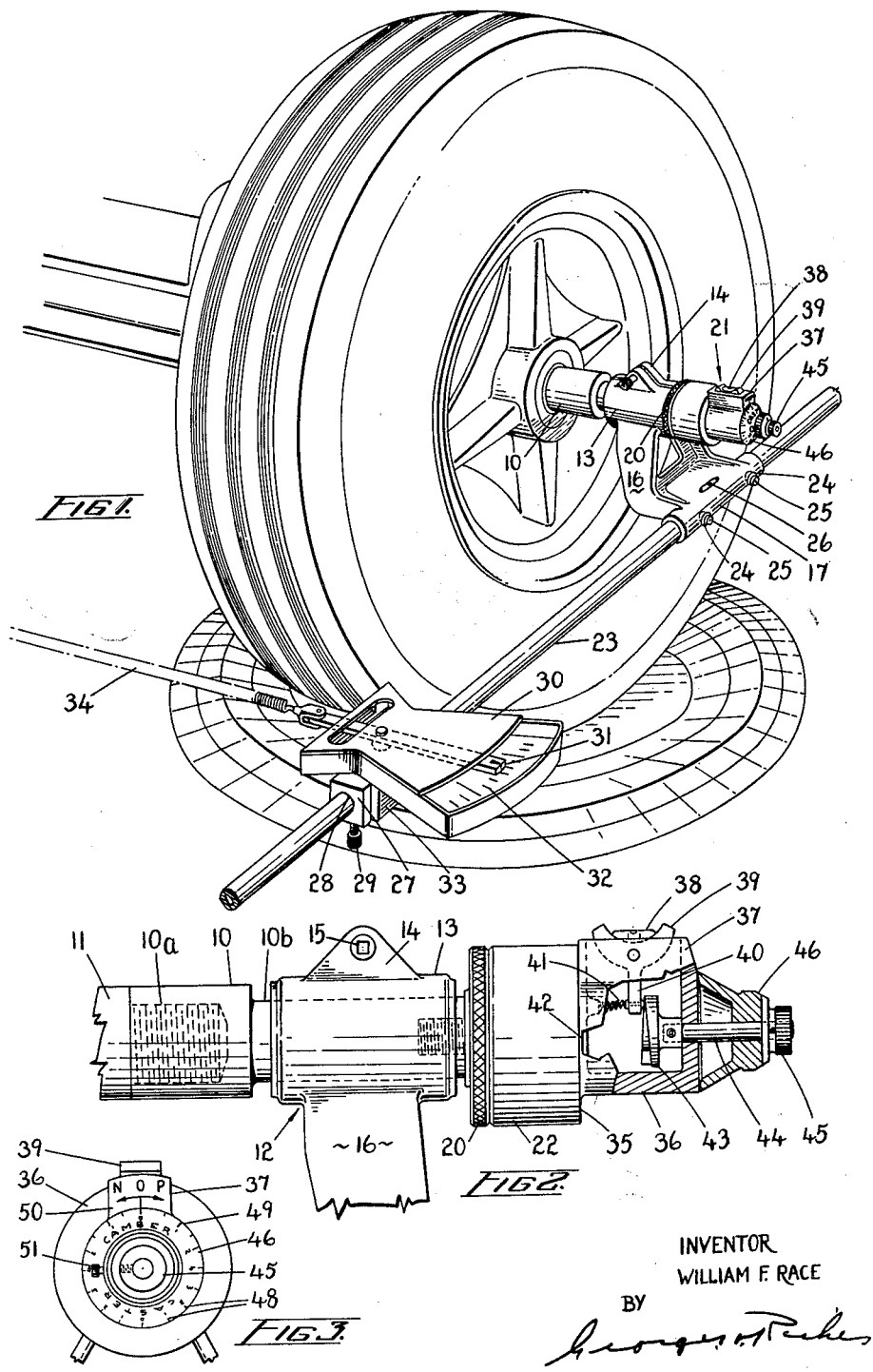

Filed Sept. 12, 1963 2 Sheets-Sheet 2

INVENTOR
WILLIAM F. RACE
BY
George F. Riches
ATTORNEY

3,188,747
TRUCK ALIGNER
William Frank Race, 118 Laird Drive, Toronto 17,
Ontario, Canada
Filed Sept. 12, 1963, Ser. No. 308,504
3 Claims. (Cl. 33—203.18)

The present invention relates to the art of measuring the alignment characteristics of the wheels of an automotive vehicle, and in particular, to an apparatus for measuring the caster, camber, king pin inclination, toe-in and toe-out on turns of the front wheels of a heavy vehicle such as a truck or bus.

One practice of using car alignment equipment to align the front wheels of a truck has not been satisfactory in view of practical disadvantages arising out of the attempt to transpose the apparatus to the heavier vehicles and becomes burdensome in those instances where the wheels must be removed to accommodate the measuring apparatus.

Another known method of adjusting the alignment characteristics or elements of the front wheels of trucks is the pit installation method. According to this method, the truck is elevated to raise the front wheels off the ground and the operator or mechanic uses the pit to gain access to the front wheel suspension. The disadvantage here is that the operation is time consuming and extremely laborious. Since 1 or 2 truck wheel alignments are done per week, on the average, a great amount of floor space is taken up by the pit which is not generally usable for other purposes.

A brief discussion of the alignment characteristics, or the steering geometry, of the front wheels is provided. In order that a vehicle, be it a truck or an automobile, may be steered easily without unnecessary wear on the tires, there are certain adjustable angles incorporated into the front wheel suspension. The interrelationship of these alignment factors or angles is termed the front end or steering geometry. The angles which are of concern here are the caster angle, the camber angle, the king pin inclination, toe-in, and toe-out or steering radius.

Camber is the amount that the front wheels are inclined outward at the top and is the distance, measured in degrees, from the perpendicular.

Caster is the amount that the king pin is tilted either towards the back or front of the car, and is usually measured in degrees. In the case of automobiles without king pins, the inclination of the knuckle support pivots is measured. Inclination of the king pin towards the back of the car is spoken of as positive caster, and the inclination towards the front of the car is negative caster.

An alignment element determinable with caster is the king pin inclination, or the knuckle support pivot inclination in the case where the automobile does not have king pins. The amount of inclination is usually measured in degrees. The effect of this element is to cause the wheels to steer in a straight line regardless of the outside forces such as crowned roads, cross winds, etc. which may tend to make the wheels steer at a tangent to the forward direction.

Toe-in is the amount that the front wheels are closer together at the front than they are at the back, and is usually measured in inches or fractions of inches. Generally speaking, the wheels are toed-in because they are cambered, the relationship being, that as the required camber increases, the toe-in correspondingly increases. A cambered wheel has the tendency to steer in the direction in which it is cambered, and therefore, to overcome this tendency, it is necessary to compensate this effect slightly in the direction opposite to which it tends to roll. Since caster and camber both effect the toe-in dimension, toe-in is generaly the last angle to be corrected on the front end.

The toe-out or steering radius is the angular difference between the outside wheel and the inside wheel on turning. When a car is undergoing a turn, the outside wheel of the turn describes a much larger circle than the inside wheel, the difference in angle being called the steering radius or the "toe-out on turns." The change in angle from toe-in in the straight ahead position to toe-out in the turn position is caused by the relative position of the steering arms to the king pin and to each other. Accordingly, if the front end angles, including toe-in are set correctly, and the toe-out is found to be incorrect the probable explanation is that one or both of the steering arms are bent.

In view of the above discussion of the alignment factors, it is seen that in order that the front wheels of an automotive vehicle be properly aligned, it is necessary that the wheels be adjusted so as to have the proper caster and camber and that the wheels be properly toed-in or toed-out, all the angles being made to conform with the manufacturers' specifications.

One object of the present invention is to provide an improved wheel alignment device for trucks which may be easily and expediently assembled and disassembled.

Another object of the present invention is to provide an alignment device which, by simple and convenient operation, enables an operator or a new operater to determine the alignment characteristics of the front wheels of a truck and to subsequently adjust them to the manufacturers' specifications.

A further object of the invention is to provide a wheel alignment assembly mountable on the spindle of the wheel without necessitating removal of the wheel including means for measuring the caster and camber, and for determining the toe-in and toe-out deflections.

According to the present invention, the wheel alignment assembly consists of a pair of devices joined by a flexible member, each device being removably mounted on one of the wheels.

Each device is comprised of an instrument supporting member mountable on the wheel spindle, the instrument supporting member having means transversely supporting a horizontal datum bar, and gauge supporting means and indicator means mounted on the datum bar, the flexible member connecting the indicators to determine the degree of deflection of the wheel. The gauge supporting means permit the utilization of a gauge for measuring the caster, camber and king pin inclination of the wheel.

Preferably, the instrument supporting member consists of a substantially cylindrical body portion having a spindle-receiving opening at one end and a substantially cylindrical supporting portion protruding from the other end, the latter having means transversely supporting a horizontal datum bar and gauge supporting means.

A specially designed gauge for measuring the caster and camber of the front wheels is applied to the gauge supporting means, preferably by means of magnetic attraction, although the attaching means is not to be restricted to this single embodiment.

The instrument supporting member has suspended therefrom a bracket consisting of two portions, an adjustable upper sleeve portion which slidably engages the supporting portion of the instrument supporting member and a lower substantially cylindrical retaining sleeve portion which transversely supports an elongated horizontal datum bar. The datum bar, preferably in the form of a substantially cylindrical shaft with indicator lines on the surface, slidably engages the lower retaining sleeve portion of the bracket.

The indicator means, consisting of a pointer and scale assembly, is mounted on a supporting block, the block slidably engaging the datum bar. The flexible member is connected to each pointer at its non-reading end thereby joining the two units and permitting the indication of wheel deflections or rotations.

A feature of the present invention is the ability to determine the alignment characteristics without removing the front wheels. Specially constructed supporting turntables are utilized, the front wheels of the vehicle resting thereon. The turntables permit the front wheels to be rotated about a vertical axis, simulating the normal turning without the friction of the ground interfering therewith. As the turntable comprises a separate invention, further specificity in respect of this aspect is reserved and mention made to it insofar as to explain the method of rotation of the wheels.

A more detailed disclosure of the invention and its mode of operation is provided below and is to be read in conjunction with the accompanying drawings in which:

FIGURE 1 is a perspective view showing one of the pair of devices mounted on the wheel spindle;

FIGURE 2 is a side elevation showing the interrelationship of the components, and the wheel spindle, and includes a portion of the gauge in section to show the interior thereof;

FIGURE 3 is an end elevation of the gauge shown in FIGURE 2;

Figure 4:
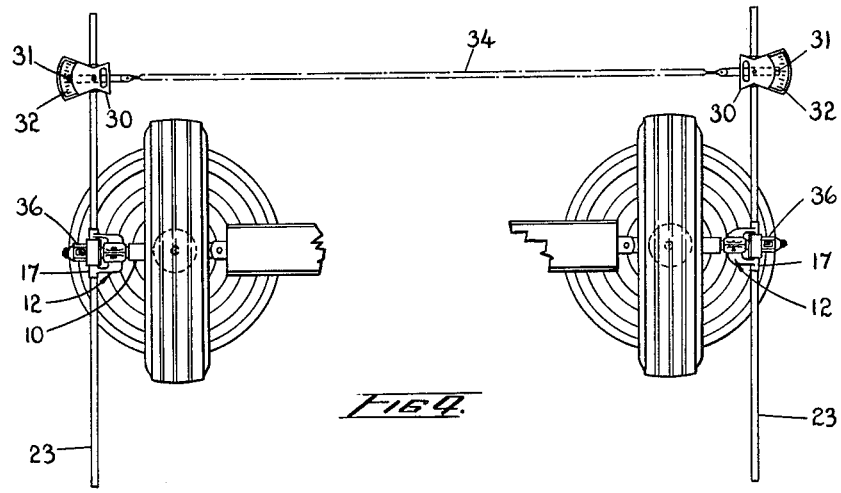
FIGURE 4 is a top elevation of the front wheels only, illustrating the two devices connected by the flexible member.
Figure 5:
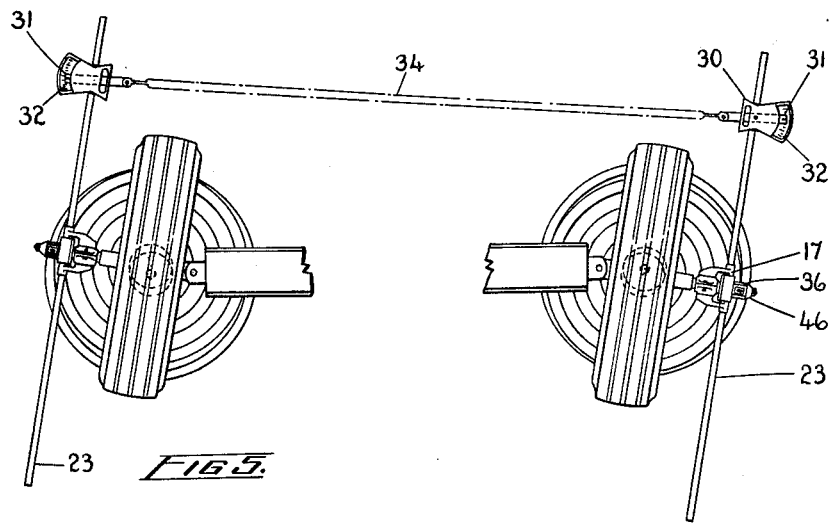
FIGURE 5 illustrates the arrangement as shown in FIGURE 4, with the wheels having been rotated.

Several preparatory steps must be undertaken initially before the unit is mounted on the wheels. The front end of the truck or bus is raised by means of a jacking device and special supporting or turn plates are placed on the floor beneath the wheels. While the truck is maintained in this position, the axle nut and washer of each front wheel are removed. The front end is then lowered, resting the wheels on the turn plates which permit the wheels to be rotated in the vertical plane. Having prepared the front wheels, the unit may now be assembled for the determination of the alignment characteristics referred to above.

Referring to FIGURE 1 of the drawings, an instrument supporting member or mandrel 10 is mounted on the wheel spindle 11, the mandrel having an internally threaded spindle-receiving opening 10a at one end and a bracket supporting portion 10b protruding from the other end. The mandrel is then rotated until it rests tightly against the roller bearings of the wheel. A datum bar supporting bracket 12, having a mandrel-receiving split sleeve 13 with tightening flanges 14, is placed over the protruding end of the mandrel and the bracket locked into position by means of a locking screw 15 which causes the tightening flanges to come together. The bracket 12 has downwardly and outwardly protruding L-shaped leg portions 16 which have at their ends a horizontal datum bar receiving sleeve 17.

The mandrel 10 has at the opposite end to the spindle receiving end, a threaded opening 18 for receiving the threaded stem 19 of the gauge-supporting member 20. The gauge-supporting member is preferably in the form of metal plate disc. The gauge-supporting member is screwed into place and a gauge 21, having a magnetic back plate 22 (FIGURE 2), is mounted thereon.

A horizontal datum member 23, preferably in the form of a metal shaft, is inserted into the sleeve 17 until substantially equal lengths of the datum member protrude on each side of the sleeve. The datum member has markings on the shaft to assist in properly locating said member in the sleeve 17 as described aforehand.

The sleeve 17 is provided on the side thereof with threaded openings 24 into which are inserted locking screws 25 which maintain the datum member in position. Located on the top of the sleeve is a spirit level 26 to indicate whether the bracket is properly aligned on the mandrel.

A block 27 having a datum member-receiving cavity 28 is installed on the datum member, and locked into place by means of a locking screw 29 protruding downwardly below the block from the bottom face thereof. Indicator means 30 comprising a pointer 31 and a graduated scale 32 are mounted on the block 27 by means of a co-operating member on the casing 33 of the indicator means, or a magnetic member on the casing (not shown). The graduated scale 32 has graduations on either side of a zero point to indicate both left-hand and right-hand deflections of the front wheels of the truck.

The pointer 31 is pivotally connected to the casing 33 at a point lying in the vertical axis of the datum member and is connected at the non-reading end thereof to one end of a flexible and extensible member 34, the member connecting each unit mounted on each front wheel.

With the wheels in the straight-ahead position, the flexible member 34 lies transversely of the datum member and is connected to each end of the pointer 31 of each unit. As the datum members are rotated with the wheels, the flexible member and the pivotal connection of the pointers maintains the pointers in the transverse position, thereby enabling the degree of deflection to be read off the scale which has also moved with the datum member.

Referring to FIGURE 2, the gauge 21 for measuring the caster and camber angles consists of a substantially cylindrical base portion 35 having a magnetic element 22 mounted into the end thereof to permit the gauge to be mounted on the gauge-supporting disc 20. Emanating from the base portion is a substantially cylindrical hollow body portion 36 and a spirit level housing 37 situated on the top and along the entire length of the body portion. The body portion 36 has an opening (not shown) in the surface thereof at the base of the housing, permitting entry into the interior of the body portion.

A spirit level 38 is mounted in a carrier 39, the carrier having a stem portion 40. The spirit level carrier 39 is pivotally mounted in the housing 37 with the carrier stem portion 40 protruding through the opening in the body portion and into the interior thereof.

A compressed spring 41, mounted on the interior wall 42 of the body 36, is in contact with the stem portion 40. In contact with the opposite side of the stem portion is a cam 43 connected to a shaft 44 which is in turn connected to a control knob 45. Mounted on the shaft 44 and behind the control knob 45 is a rotatable dial 46, having on the face 47 thereof graduations for the measurement of the caster and camber angles, these being in the form of a caster scale 48 and a camber scale 49. As the control knob is turned, the stem portion travels along the face of the cam from the lowest to the highest position of the face until the stepped portion of the cam is reached. The carrier stem being spring-urged is then caused to move downwardly to the lowest point of the cam face, from whence the aforementioned operation is repeated.

Referring to FIGURE 3, the front face 50 of the spirit level housing contains the centering indicator or line "0" with the numeral "N" to the left and the numeral "P" to the right thereof. Referring to the earlier discussion on the alignment characteristics, when the dial 46 is moved to the left or in the direction of "N," the reading on the caster scale 48 will be of "negative caster" and to the right, the reading will be of "positive caster." A thumb screw 51 locks the dial 46 unto the shaft 44 in order that readings of caster and camber may be taken.

Having installed the unit on the front wheels, the alignment characteristics discussed hereinabove are determined in the following manner.

Caster

The caster angle is determined first. Many trucks do not turn as far as passenger automobiles, and therefore a lesser turn will be necessary to check the caster. However, the amount turned to the front will be the amount turned to the rear, as for example, 22½° to the front and 22½° to the rear. The following steps are undertaken for the determination of caster:

(a) The wheel is turned 22½° to the front;
(b) The control knob 45 of the gauge is turned until the spirit level 38 is centered;
(c) The caster scale 48 of dial 46 is rotated until the zero of the caster scale is centered with the zero of plate 50. This setting is then locked by tightening the thumb screw 51;
(d) The vehicle wheel is then rotated 22½° to the rear;
(e) The control knob 45 is rotated until the spirit level 38 is centered (i.e. bubble in the center).
(f) The value of the caster angle is obtained by noting the reading of the caster scale under the "0" of the plate 50.

The gauge is then removed and placed on the face plate of the unit mounted on the other front wheel and the aforementioned procedure repeated to check the resultant caster reading. The caster readings should be identical for both front wheels, and these may be compared to the manufacturers' specified caster angles which are obtainable from any of the well-known automotive data books.

Camber

The determination of the camber angle follows the caster determination and adjustment. The following steps will enable an operator to determine camber and to adjust it to the manufacturers' specified value:

(a) With the wheels in the "straight-ahead" position the control knob 45 and the dial 46 are rotated until the mark on the control knob and the camber scale 49 of dial 46 are in line with the "zero" mark of plate 50. The thumb screw 51 is then tightened to maintain this position of the scale and control knob.
(b) The control knob is rotated until the desired camber reading is obtained (this is usually the manufacturers' specified camber).
(c) Adjustments are made to the wheel until the spirit level 38 of gauge 21 is centered. It is recommended that the locking nuts should be tightened firmly to ensure proper results.

Toe-in

As in the determination of camber, the front wheels are set in the "straight-ahead" position. The angle between the two wheel directions is measured by utilizing the horizontal datum member 23, the indicator means 30, and the flexible member 34. With the wheels positioned in the above manner, the pointer 31 will indicate on the scale 32 the amount of deviation from the perpendicular. Adjustments are made to the front suspension to bring the front wheels into symmetry with the fore and aft axis. Assuming that the desired toe-in angle is 4°, the wheels are rotated until the pointed 31 shows on scale 32 a reading of 2° forward of the zero marking. The other wheel is then adjusted until the pointer of the unit mounted thereon reads 2° forward of the zero marking. In this manner the toe-in of the wheels is adjusted to be 4° as required.

King pin inclination

The front wheels are placed in the "straight-ahead" position, and the zero mark of caster scale 48 is aligned with the zero line of plate 50. The axle of the unit must be adjusted to caster a reading of zero on the caster scale to obtain a proper king-pin inclination reading. The dial 46 is rotated until the bubble in spirit level 38 is centered, and then the dial is locked by means of the thumb screw 51. The front wheels are then rotated 22½°, with the resultant effect that the bubble of the spirit level will be off-center. By turning the dial 46 until the bubble is centered once again, a reading may be obtained from the caster scale. This reading, multiplied by two, will give the king pin inclination of the front wheel suspension.

Steering radius for toe-out on turns

The front wheels being in the straight ahead position, are rotated until the spindle is turned towards the front. It will be noticed that the outside wheel of the turn describes a much larger circle than the inside wheel. The reading is taken off the scale 32 of indicator means 30 on the inside wheel. The wheels are then rotated in the opposite direction and the reading obtained for the other wheel. In both cases the reading is taken of the inside wheel on the turn, and if the steering radius is correct, the reading will be the same for both wheels.

What I claim as new and desire to protect by Letters Patent of the United States is:

1. In an apparatus for measuring the alignment characteristics of front wheels of an automotive vehicle, the combination comprising, a support member including a mandrel having a tapped end for connection to a wheel spindle and terminating at the other end in an instrument supporting member; a split sleeve operable to clamp around an intermediate portion of said mandrel and including downwardly depending arm means, said arm means terminating in a horizontal extension; a horizontal tubular sleeve element carried by said extension and operable to receive and support an elongated datum shaft therein, said tubular sleeve being normal to the spindle axis, and level-indicating means on said tubular sleeve to indicate the orientation of the sleeve axis about the horizontal; measuring instrument means comprising a housing having magnetic clamping means at one end thereof for releasably connecting the measuring instrument means to said instrument supporting member; a spirit level carrier pivotally mounted on said housing and including a downwardly depending stem portion; cam means mounted for rotation with a shaft element rotatably mounted in the other end of said housing, said stem portion being biased into contact with said cam means; dial means freely rotatable on said shaft element and registerable with an index mark on said housing and locking means operable to selectively lock said dial means on said shaft.

2. In an apparatus for measuring the alignment characteristics of front wheels of an automotive vehicle, the combination as defined in claim 1 and including an elongated datum shaft slidably mounted in said tubular sleeve element; locking means on said tubular sleeve element to releasably lock the datum shaft relative to the tubular sleeve element; indicator means slidably mounted on the forward end of said datum shaft.

3. In an apparatus for measuring the alignment characteristics of front wheels of an automotive vehicle, the combination comprising, a pair of support members, each support member including a mandrel having a tapped end for connection to a wheel spindle and terminating at the other end in an instrument supporting member; split sleeves including locking means and being operable to clamp around respective intermediate portions of each said mandrel, said split sleeves each further including downwardly depending arm means; said arm means terminating in horizontal extensions; horizontal tubular sleeve elements mounted one on each of the said extensions, said tubular sleeves being normal to a respective spindle axis, and level-indicating means on each said tubular sleeve to indicate the orientation of the sleeve axis about the horizontal; an elongated datum shaft slidably mounted in each said tubular sleeve element and locking means operable to releasably secure the datum shafts relative to their respective sleeve elements; indicator means slidably mounted on forward ends of each datum shaft, said indicator means each including a graduated scale and a pivoted pointer means; a flexible member interconnecting said pointers to determine the degree of deflection of the wheels and a single measuring instrument means having magnetic connecting means thereon and operable for connection to a selected one of the instrument supporting members to measure caster, camber and king-pin inclination of said front wheels.

References Cited by the Examiner
UNITED STATES PATENTS

| | | | |
|---|---|---|---|
| 1,804,490 | 5/31 | Bagge | 33—203.18 |
| 2,077,082 | 4/37 | Wedlake | 33—203.18 |
| 2,160,226 | 5/39 | Phillips | 33—203.18 X |
| 2,608,000 | 8/52 | Castiglia | 33—203.18 |
| 2,780,875 | 2/57 | Carr | 33—203.18 |
| 3,079,695 | 3/63 | Mineck | 33—203.12 |

ISAAC LISANN, *Primary Examiner.*